US009659590B1

(12) United States Patent
Peng

(10) Patent No.: US 9,659,590 B1
(45) Date of Patent: May 23, 2017

(54) ANGLED NEAR-FIELD TRANSDUCER AND WAVEGUIDE

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/928,611

(22) Filed: Oct. 30, 2015

(51) Int. Cl.
*G11B 5/127* (2006.01)
*G11B 11/00* (2006.01)
*G11B 5/02* (2006.01)
*G11B 5/48* (2006.01)
*G11B 5/00* (2006.01)

(52) U.S. Cl.
CPC .... *G11B 5/4866* (2013.01); *G11B 2005/0021* (2013.01)

(58) Field of Classification Search
CPC ........ G11B 11/10534; G11B 11/10558; G11B 2005/0021; G11B 2005/0005; G11B 5/314; G11B 5/3903; G11B 5/4866; G11B 5/6082; G11B 11/10543; G11B 5/3163; B82Y 25/00; B82Y 10/00
USPC .......... 360/59, 313; 369/13.32, 13.33, 13.17, 369/244.1, 234.7
See application file for complete search history.

(56) References Cited

U.S. PATENT DOCUMENTS

| | | | |
|---|---|---|---|
| 2,914,741 A | 11/1959 | Unger | |
| 5,200,939 A | 4/1993 | Nishiwaki et al. | |
| 6,388,840 B1 * | 5/2002 | Ohwe | G11B 5/486 360/244.1 |
| 8,670,294 B1 | 3/2014 | Shi et al. | |
| 8,670,295 B1 | 3/2014 | Hu et al. | |
| 8,861,124 B1 | 10/2014 | Finot et al. | |
| 9,251,819 B2 | 2/2016 | Peng | |
| 9,336,814 B1 * | 5/2016 | Shi | G11B 13/04 |
| 2008/0204916 A1 | 8/2008 | Matsumoto et al. | |
| 2010/0238580 A1 | 9/2010 | Shimazawa et al. | |
| 2011/0122737 A1 | 5/2011 | Shimazawa et al. | |
| 2011/0181979 A1 | 7/2011 | Jin et al. | |
| 2013/0223196 A1 | 8/2013 | Gao et al. | |
| 2014/0036646 A1 | 2/2014 | Peng et al. | |
| 2014/0241137 A1 | 8/2014 | Jin et al. | |
| 2014/0325827 A1 | 11/2014 | Lipson et al. | |
| 2015/0109822 A1 | 4/2015 | Ouderkirk | |
| 2015/0318005 A1 | 11/2015 | Kim et al. | |

OTHER PUBLICATIONS

File History for U.S. Appl. No. 14/995,754 retrieved from the U.S. Patent and Trademark Office PAIR System on Aug. 31, 2016, 83 pages.

* cited by examiner

*Primary Examiner* — Nabil Hindi
(74) *Attorney, Agent, or Firm* — Hollingsworth Davis, LLC

(57) ABSTRACT

An apparatus comprises a waveguide having an input end that receives energy in a transverse electric ($TE_{00}$) mode from an energy source along a substrate-parallel plane. The apparatus also includes a near-field transducer located proximate an output end of the waveguide that receives the energy in the $TE_{00}$ mode. The output end of the waveguide is at an oblique angle to a cross-track line at an intersection of a media-facing surface and the substrate-parallel plane. The near-field transducer includes an enlarged portion at the oblique angle to the cross-track line.

20 Claims, 10 Drawing Sheets

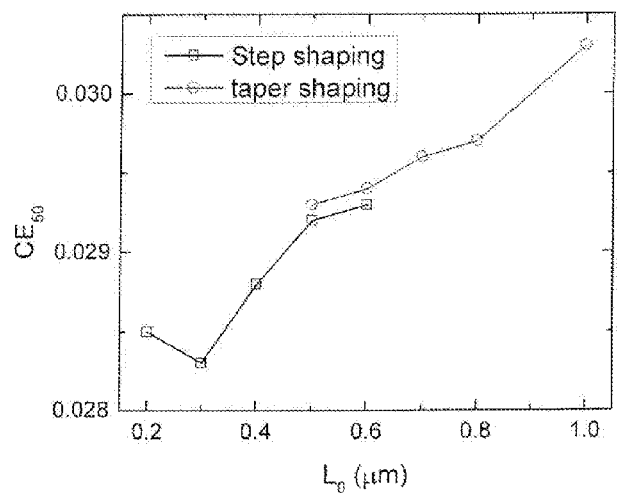
FIG. 9
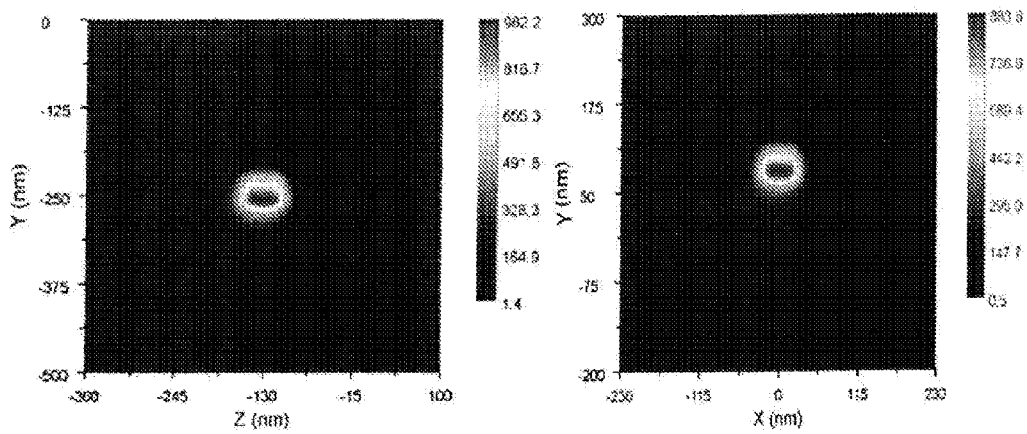
FIG. 10A
FIG. 10B

ANGLED NEAR-FIELD TRANSDUCER AND WAVEGUIDE

SUMMARY

An apparatus comprises a waveguide and a near-field transducer. The waveguide has an input end that receives energy in a transverse electric ($TE_{00}$) mode from an energy source along a substrate-parallel plane. The near-field transducer is located proximate an output end of the waveguide and receives the energy in the $TE_{00}$ mode. The output end of the waveguide is at an oblique angle to a cross-track line at an intersection of a media-facing surface and the substrate-parallel plane. The near-field transducer comprises an enlarged portion comprising first and second curved ends connected by straight sides and is oriented at the oblique angle to the cross-track line. The peg extends from the enlarged portion towards the media-facing surface at a normal angle to the cross-track line.

An apparatus according to another embodiment comprises a waveguide and a near-field transducer. The waveguide has an input end that receives energy in a transverse electric ($TE_{00}$) mode from an energy source along a substrate-parallel plane and an output end, wherein a width of the waveguide in a cross-track direction varies between the input end and the output end. The near-field transducer is located proximate an output end of the waveguide and receives the energy in the $TE_{00}$ mode. The output end of the waveguide is at an oblique angle to a cross-track line at an intersection of a media-facing surface and the substrate-parallel plane. The near-field transducer comprises an enlarged portion comprising first and second curved ends connected by straight sides and is oriented at the oblique angle to the cross-track line. The peg extends from the enlarged portion towards the media-facing surface at a normal angle to the cross-track line.

A further embodiment is directed to a method comprising emitting energy in a transverse electric ($TE_{00}$) mode from an energy source to an input surface of a recording head. The energy in the $TE_{00}$ mode is received with an input end of a waveguide proximate the input surface. The energy in the $TE_{00}$ mode is guided to an output end of the waveguide proximate an output surface of the recording head. The output end is at an oblique angle to a cross-track line at an intersection of the output surface and a plane normal to the output surface. The energy is also guided to a near field transducer proximate the output end, wherein the near field transducer comprises an enlarged portion and a peg. The enlarged portion comprises first and second circular ends connected by straight sides and oriented at the oblique angle to the cross-track line. The energy is delivered to heat a portion of a recording medium via the near field transducer.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

FIG. 9 is a graph illustrating near-field transducer efficiency as a function of type and length of waveguide shaping according to example embodiments;

FIG. 10A is a profile of light absorption by a recording medium for $TE_{00}$ mode excited energy according to an example embodiment;

FIG. 10B is a profile of light absorption by a recording medium for $TE_{10}$ mode excited energy.

DETAILED DESCRIPTION

Figure 1:
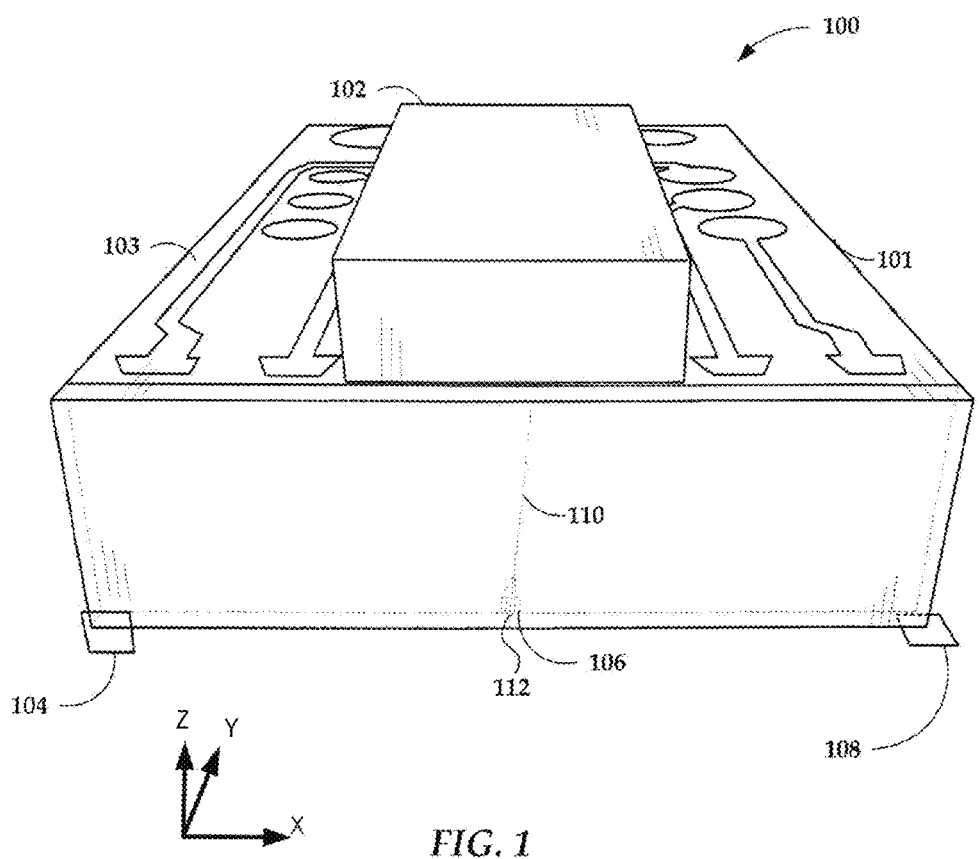
FIG. 1 is a perspective view of a slider assembly according to an example embodiment.

The present disclosure is generally related to the use of an angled waveguide (e.g., channel waveguide) that receives light from an energy source (e.g., laser diode) and delivers the light to a recording medium (e.g., a thermally-assisted, magnetic recording medium) at an angle other than normal to the output surface of a recording head. The waveguide is formed integrally within the recording head and additional recording head features (e.g., a near-field transducer) may also be formed at an angle. The laser diode may be attached to an outer surface of the recording head and direct its output to the waveguide at an angle approximately normal to the output surface of the recording head. The angle of the waveguide is selected to reduce reflection of the laser output from a recording medium and/or near-field transducer back to the laser diode. This reduction in reflection helps reduce laser instability issues including mode hopping.

A heat-assisted, magnetic recording (HAMR) data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

A HAMR read/write element, sometimes referred to as a slider or read/write head, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider will also generally include a source of energy, such as a laser diode, and an optical delivery path through the slider that delivers the energy to the surface of the medium.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc. The NFT for a HAMR device is very small (e.g., on the order of $0.2\lambda$ to $2\lambda$, $\lambda$ denoting light wavelength for excitation) including a peg portion and an expanded portion and creates a localized region of high power density in the media through an electromagnetic interaction. This results in a high temperature rise in a small region on the media, with the region exceeding the Curie temperature having dimensions less than 100 nm.

A laser (or other energy source) may be separated from or attached to the HAMR slider. Configurations where a laser (e.g., edge-emitting or surface-emitting) is attached to the HAMR slider allows for parallel attachment of large numbers of lasers at once to a wafer of slider bodies, thereby reducing manufacturing costs. Depending on the orientation of the laser, light output of the laser may be parallel to the plane of the wafer to direct output energy at an angle approximately perpendicular, or normal, to the media-facing surface.

A light source such as an edge-emitting laser diode often has a fundamental, transverse electric mode, a $TE_{00}$-like output beam profile. However, some configurations of a HAMR slider convert the light to $TE_{10}$ mode. This can be done to utilize solid immersion mirrors to focus light delivery on NFTs with a lollipop shape, or to use a $TE_{10}$ waveguide mode light delivery with a stadium-style NFT, where the stadium-style NFT has almost double the NFT width of a lollipop NFT. While these $TE_{10}$ configurations can provide efficient light delivery to a recording medium, they can also yield significant reflected light returned to the energy source, e.g., laser diode. Largely angling a channel waveguide at the media-facing surface of a slider to deliver single transverse mode ($TE_{00}$) light reduces light reflected back to the energy source. Embodiments described herein do not incorporate a mode order converter or a polarization converter thereby providing a simpler light path. Also, using a laser diode with transverse electric mode provides greater choices in laser emission wavelengths than lasers having transverse magnetic (TM) mode.

In embodiments described below, a waveguide is used to guide and direct energy from the laser diode to the recording medium. In reference to FIG. 1, a perspective view shows a HAMR slider assembly 100 according to an example embodiment. The slider assembly 100 includes an energy source 102 (e.g., laser diode) located on input surface 103 of a slider body 101. The energy source 102 delivers light to a region proximate a HAMR read/write head 106, which is located near a media-facing surface 108 of the slider body 101. The media-facing surface 108 faces and is held proximate to the moving medium surface during device operation. The media-facing surface 108 may be configured as an air-bearing surface (ABS) that maintains separation from the media surface via a thin layer of air.

The slider assembly 100 tracks across the magnetic recording medium in the x-axis of FIG. 1, also referred to as the cross-track direction. Relative to the slider, the magnetic recording medium rotates in the orthogonal y-axis direction, referred to as the down-track direction. The edge of the slider that first passes over any position of the rotating recording medium in the down-track direction is referred to as the leading edge, and the edge of the slider that is last to pass over the position of the recording medium is referred to as the trailing edge, designated by plane 104. The magnetic recording head arrangement, with slider assembly 100, reads and/or writes bits to the rotating magnetic recording medium as the magnetic recording medium rotates relative to the slider.

The energy source 102 provides electromagnetic energy used to heat the recording medium as it passes by the read/write head 106. Optical coupling components, such as a waveguide 110, are formed integrally within the slider assembly 100 and form an optical path that delivers energy from the energy source 102 to the recording medium via a near-field transducer (NFT) 112. The laser light can be focused on the NFT 112 with a variety of optical elements such as a tapered optical waveguide or a curved channel waveguide. The near-field transducer 112 is near the read/write head 106 and causes heating of the medium during recording operations.

In this example, the energy source is an edge-emitting laser that emits light from an elongated channel that has an output located near a corner edge of the laser. The edge-emitting laser is surface mounted on input surface 103 and emits light normal (or approximately so) to the input surface 103, e.g., along the z-direction. The waveguide 110 and variations thereof described herein may also be used with other types of laser diodes, such as vertical cavity, surface-emitting lasers (VCSELs). Generally, a VCSEL emits light in a direction perpendicular to a surface of the laser body. The energy source 102 may be mounted on a surface of the slider body 101 (or in a pocket or cavity). A surface-emitting or edge-emitting laser in any of these examples may be coupled to the slider body 101, or via a coupling component such as a submount (not shown).

The energy source 102 can be mounted external, or integral, to the magnetic recording head arrangement. While the example in FIG. 1 shows energy source 102 directly mounted to the slider assembly 100, the waveguide 110 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a coupling feature on an input surface 103 into which light is coupled and delivered to a waveguide 110 which propagates the light in a direction to energize the near-field transducer 112. As will be described in greater detail hereinbelow, the waveguide 110 facilitates directing light to the media-facing surface 108 at an angle other than normal in the cross-track (x-axis) direction of the media-facing surface 108.

Figure 2A:
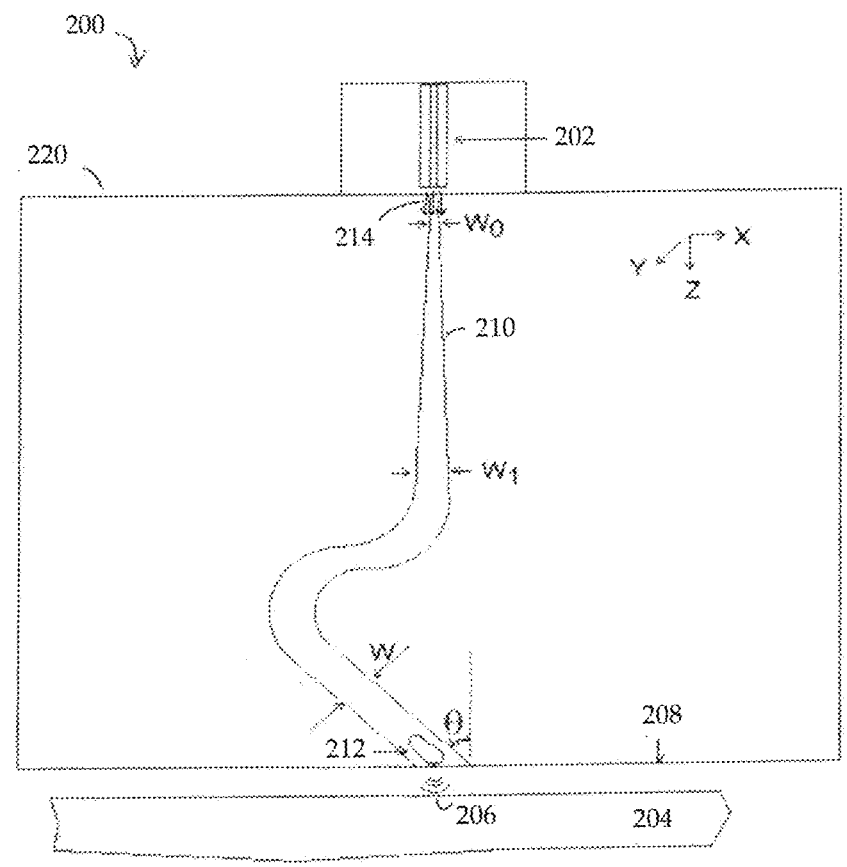
FIGS. 2A-B are cross-sectional views illustrating waveguide configurations according to example embodiments.
Figure 2B:
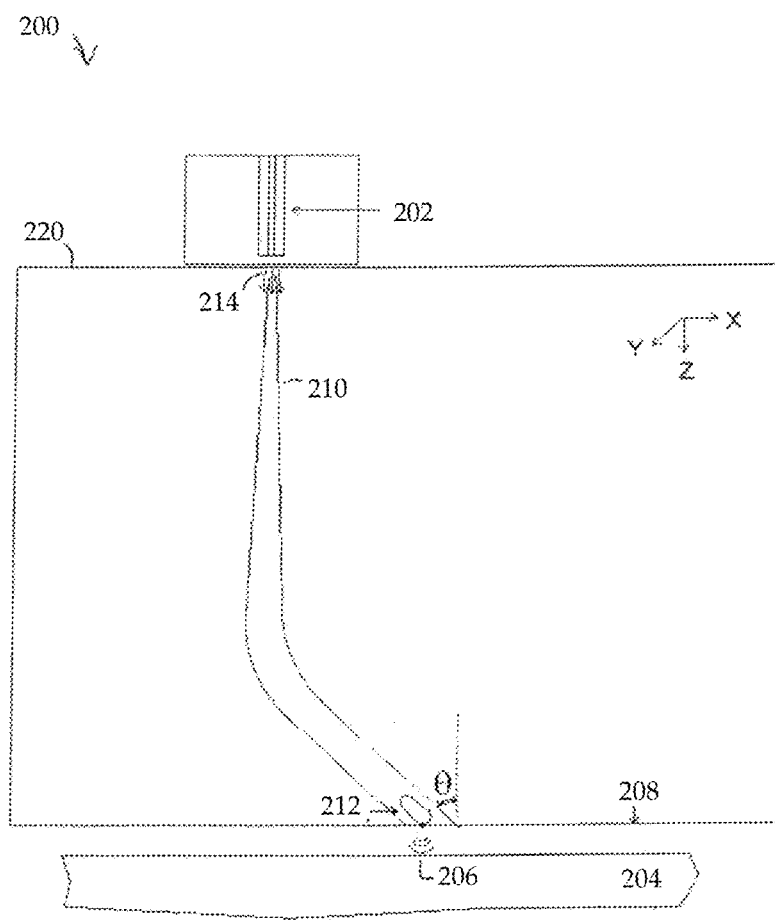

In reference now to FIGS. 2A-B, two configurations for light delivery to a plasmonic near-field transducer (NFT) integrated with a writer are shown. In FIG. 2A, an energy source 202, such as a laser diode, launches light into a waveguide 210 on a slider assembly 200 by a waveguide input coupler 214. In certain embodiments, the laser diode 202 is an edge-emitting laser diode mounted on a submount. The laser diode 202 is polarized along the x direction (using the coordinates shown on FIGS. 2A-B), exciting a fundamental transverse electric mode ($TE_{00}$) in the waveguide 210. The waveguide core dimension is selected to support only single transverse electric mode. An assistant layer underneath or above the waveguide core may be used to match the mode profile between the energy source 202 and the waveguide input coupler 214, such as a tapered input coupler, at the energy source/waveguide interface for efficient coupling between the energy source 202 and the waveguide 210. Examples of assistant waveguide core layers are further described in U.S. Pat. No. 8,385,183, which is incorporated herein.

Regardless of the presence of such assistant layers, the waveguide 210 includes at least one core layer surrounded by one or more cladding layers. The waveguide core is made of dielectric materials of high index of refraction, for example, $Ta_2O_5$ (tantalum oxide), $TiO_2$ (titanium oxide), $Nb_2O_5$ (niobium oxide), $SiN_x$ (silicon nitride, including $Si_3N_4$), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers are each formed of a dielectric material having a refractive index lower than that of the core; such materials may include $Al_2O_3$ (aluminum oxide), SiO (silicon oxide), $SiO_2$ (silica), $SiO_xN_y$ (silicon oxynitride), and AlN (aluminum nitride). The higher refractive index of the waveguide core facilitates efficient propagation of energy, e.g., light, through the waveguide 210.

Light, in the transverse electric mode, propagates along the waveguide 210 and excites a plasmonic NFT 212, which concentrates optical energy into a tiny spot 206 well below far-field diffraction limit and delivers this energy to a magnetic recording medium 204. The delivered energy heats the medium 204 during writing with a switching magnetic field from a magnetic pole (not shown).

The waveguide 210 is nearly normal to the energy source-facing surface 220 such that the light exiting from the energy source 202 is nearly normal to this surface 220 for coupling efficiency from energy source 202 to the waveguide 210. However, the waveguide 210 near the media-facing surface 208 is tilted, or angled, from a direction normal to the media-facing surface 208 (represented by the dashed line), e.g., angled from the z-axis of FIG. 2A. It can be seen in FIGS. 2A-B that while the waveguide 210 is disposed at an angle other than normal at the media-facing surface 208, the end portion of the waveguide 210 is flush with the media-facing surface 208. The angle at which the waveguide 210 is tilted from a direction normal to the media-facing surface 208 is selected to suppress return light reflected from the recording medium 204 and the near-field transducer/writer into the energy source 202 and can be a large angle as shown below in FIG. 3. Reflected light that reaches the energy source 202 can cause laser instability such as mode hopping.

Depending on the location of the energy source 202, the width and shape of the waveguide 210 can vary. For example, FIG. 2A shows an energy source 202 centered on slider 200. The waveguide 210 then bends, in an S-shaped curve, to provide an angled approach, in the cross-track direction (x-direction), to the media facing surface 208. In addition to the curving shape of the waveguide 210, the width of the waveguide 210, again in the cross-track direction, varies along the length of the waveguide 210. For example, a width at the input end of the waveguide 210, $W_0$, accommodates an efficient coupling to the energy source 202. Further along the waveguide, in the z direction toward the media-facing surface 208, the width expands to width, $W_1$, prior to, or part of initiating, the curvature. After the waveguide 210 attains the tilt angle, θ, for approaching the media-facing surface 208, width, W, is established. FIG. 2B shows an alternative configuration for slider 200. In FIG. 2B, the energy source 202 is positioned off-center on the input surface 220 of the slider 200. Here, the waveguide 210 includes one bend in the cross-track direction as the waveguide 210 attains the tilt angle, θ, toward the media-facing surface 208. Similar to FIG. 2A, the waveguide width can vary, e.g., gradually expand, along the length of the waveguide in the z-direction, at least up to the curvature in the waveguide 210. The changing widths accommodate both coupling the energy source 202 at the input surface 220 with an input coupler 214 as well as integrating an NFT 212 at the media-facing surface 208.

Since the features of a slider assembly, such as 200, can be manufactured by depositing a plurality of layers, the waveguide layers are disposed in a plane parallel to a deposition substrate. While the waveguide could be angled in any direction with respect to the media-facing surface 208, the waveguide 210 is shown here angled in the cross-track direction such that the waveguide 210 is created by a combination of masking and deposition steps. Thus, as shown, the waveguide 210, and NFT 212 can be angled with respect to the media-facing surface 208 in planes parallel to each other, as well as to other slider assembly features such as a write pole (not shown).

The tilt angle, θ, of the waveguide 210 is selected to minimize, or prevent, light being reflected from the recording medium's surface and the near-field transducer/writer from traveling back through the slider assembly 200 to the energy source 202. In certain embodiments, to determine the tilt angle θ, the return light is calculated through a channel waveguide coupled with a recording medium. In this modeling/calculation, there is no NFT or magnetic pole in the slider. A generic medium comprising an FePt layer (e.g., 15 nm thick with a complex refractive index n=2.55+j 2.72), an MgO layer (10 nm thick, n=1.70), a heat sink Cu layer (60 nm thick, n=0.26+j 5.29), and a glass substrate is assumed. The head to medium spacing (e.g., distance between the media-facing surface and the recording medium) is set at 10 nm with an effective index of n=1.21. The waveguide is composed of a TiOx core of refractive index of n=2.35, surrounded with $SiO_2$ (n=1.46) cladding. The core is 390 nm wide (W) and 120 nm thick (along the y-axis of FIGS. 2A-B), and the light wavelength (λ) is 830 nm.

Figure 3:
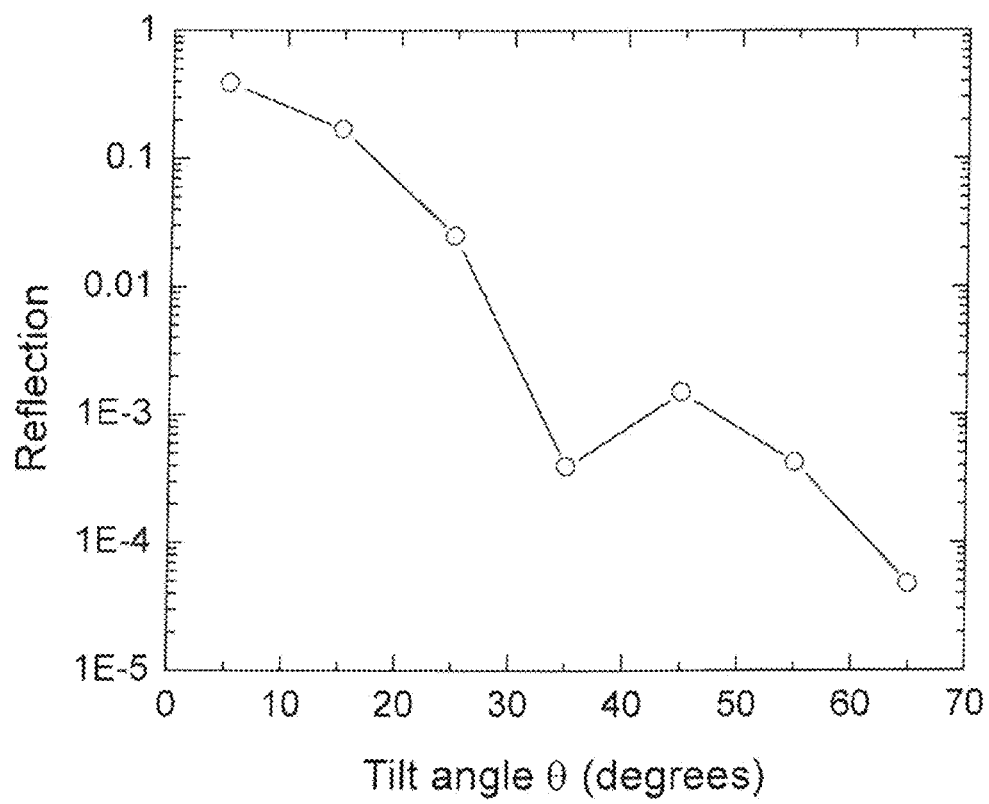
FIG. 3 is a graph illustrating reflected energy as a function of waveguide tilt angle according to example embodiments.

FIG. 3 is a graph showing the amount of detected return transverse electric mode ($TE_{00}$) light reflected from a recording medium as a function of the waveguide tilt angle, θ, at the media-facing surface. The tested medium is highly reflective. For example, at a tilt angle of five degrees (θ=5°), the amount of returned $TE_{00}$ mode reaches 45%. As the tilt angle increases, e.g., θ>25°, the returned light decreases substantially. To obtain a return light below 0.1%, the tilt angle, θ, should be equal to or greater than 30° from normal to the media-facing surface. In addition to tilting the waveguide, the NFT, or a portion thereof, can also be tilted.

Figure 4A:
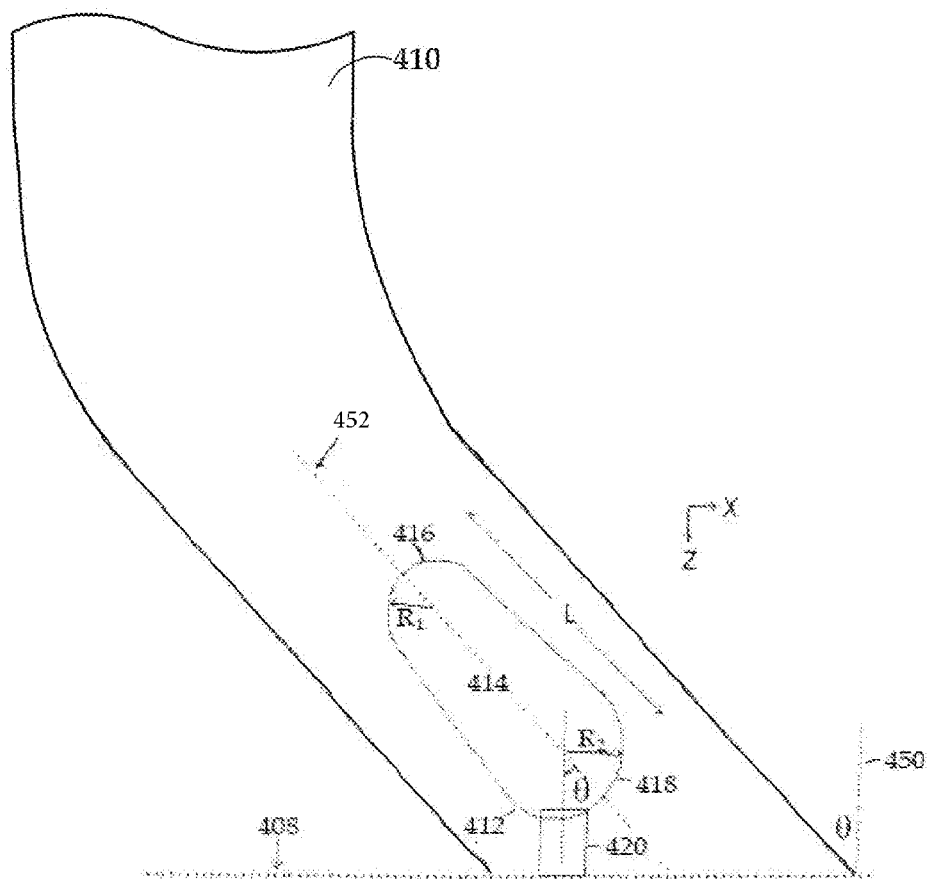
FIG. 4A is a cross-sectional view in the cross-track direction of an angled waveguide with a near field transducer according to an example embodiment.
Figure 4B:
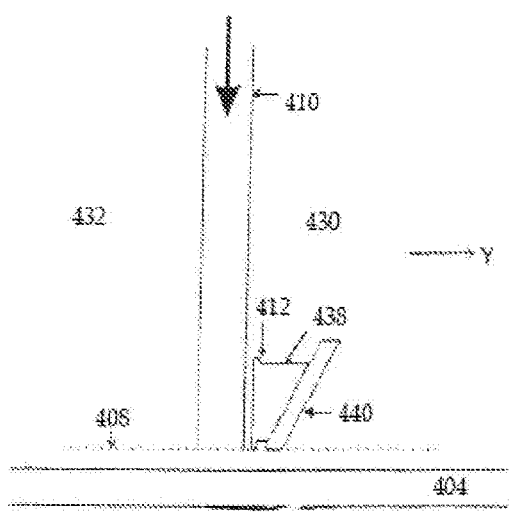
FIG. 4B is a cross-sectional view in the down-track direction of the angled waveguide of FIG. 4A.

FIGS. 4A-B illustrate cross-sections of an NFT 412 with $TE_{00}$ waveguide mode excitation and angled with an angled waveguide core 410 in accordance with example embodiments. FIG. 4A shows a cross-section of a waveguide core 410 and NFT 412 on a plane parallel to the waveguide in the cross-track direction (x-direction) of a slider. The waveguide core 410 near the media-facing surface 408 is tilted at an angle, θ, from a direction normal to the media facing surface 408 (represented by dashed line 450). The angle, θ, is an oblique angle to a cross-track line at an intersection of the media-facing surface 408 and a substrate-parallel plane, which refers to the substrate upon which the layers of the slider are deposited and is substantially normal to the media-facing surface 408. In addition to angling the waveguide core 410 at the media-facing surface 408, the NFT 412 can also be shaped and angled.

The NFT 412 has an enlarged portion 414 having a tear-drop shape with two curved, circular ends 416, 418 and with a protruded peg 420. The NFT 412 is located at the top cladding layer of the waveguide 430 and proximate the waveguide core 410. A first, top end 416 is positioned away from the media-facing surface 408 and first receives the incoming energy guided by the waveguide core 410. The first end 416 has a first radius, $R_1$, and is convex shaped, which reduces reflection of the incoming light onto it. A second, bottom end 418 is positioned closer to the media-facing surface 408 and couples to the peg 420. The second end 418 has a second radius, $R_2$, and is also convex-shaped, which improves the impedance match between the enlarged portion 414 and the peg 420 such that the impedance gradually increases. The circular first and second ends, in some embodiments, have radii where $R_2 \geq R_1$ for NFT efficiency. The middle section of the enlarged portion 414 has a length, L, and is shown with straight sides that connect the first and second circular ends.

The enlarged portion of the NFT 414 is nearly centered along the waveguide core's center line (shown as dashed line 452), but the peg 420 is positioned off the waveguide core's center line. The enlarged portion 414 might also be off the waveguide core's center line to mitigate the reflection from the recording medium 404 and near-field transducer/writer. The peg 420 is substantially normal to the media-facing surface 408 and is coupled with the enlarged portion of the NFT 414 at the portion protruding closest to the media-facing surface 408, e.g., the portion of the second end 418 closest to the media-facing surface 408. The peg can be positioned along the x direction about 10-30 nm to the left (i.e., negative x direction in the figure) from the most protruding position of the enlarged portion 414. Although not shown, the peg 420 can also be slanted, similar to the enlarged portion 414, to improve the thermal gradient and to reduce the peg 420 temperature. The NFT 412 interacts with the $TE_{00}$ waveguide mode, generating local surface plasmon at the circumference of the enlarged portion of the NFT 414. Charges funnel into the peg 420 resulting in lightning effect. Several dimensions can be altered to affect the efficiency of NFT 412 excitation such as the waveguide core dimensions (e.g, width and angle), shape of the NFT (e.g., end curvatures $R_1$, $R_2$ and length, L), and the peg height (along the z-direction).

In FIG. 4B, the waveguide core 410 and NFT 412 of FIG. 4A are shown in cross-section in the down-track direction (e.g., rotated ninety degrees from the view of FIG. 4A) proximate a recording medium 404. The arrow represents light in the fundamental transverse electric mode being guided by the waveguide core 410 and both the top cladding 430 and bottom cladding 432 are shown. In addition to the waveguide core 410 and NFT 412, a magnetic pole 440 and heatsink 438 are shown. The magnetic pole 440 is positioned approximately 20-50 nm from the NFT 412. The heatsink 438 for the NFT 412 can take various sizes, shapes, and locations including, but not limited to, the same footprint as the enlarged portion 414, smaller than the enlarged portion 414, and recessed from the media-facing surface 408. The various heatsink 438 configurations affect the thermal gradient resulting in sharp write magnetic transitions.

Figure 5:
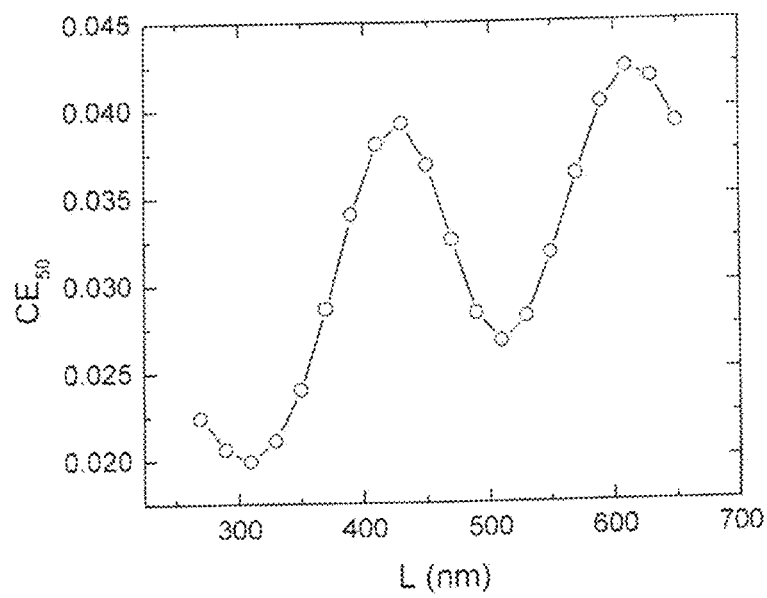
FIG. 5 is a graph illustrating near-field transducer efficiency as a function of the length of the near-field transducer according to an example embodiment.

To determine various NFT 412 dimensions (e.g., $R_1$, $R_2$ and length, L) and evaluate the performance of an NFT 412 according to embodiments disclosed herein, NFT efficiency, $CE_{50}$, is measured. NFT efficiency, $CE_{50}$, is defined as the light absorption in the FePt layer of a magnetic medium in a foot print of 50 nm by 50 nm. In measuring the NFT efficiency, as shown in the results of FIG. 5 to evaluate the length of the enlarged portion of the NFT, it is assumed that no magnetic pole was present. The thickness of the enlarged portion of the NFT in the y-direction (using the coordinates of FIGS. 4A-B) is 60 nm. Also, the peg dimensions are set at 30 nm thick along the y-direction, 60 nm wide along the x-direction, and 20 nm high along the z-direction. The NFT is made of gold, and both the enlarged portion of the NFT and the peg are positioned 20 nm away from the waveguide core. While the radii of the first and second circular ends of the NFT enlarged portion can vary, a first radius, $R_1$, of approximately 80 nm and a second radius, $R_2$ of approximately 110 nm were used. These dimensions are similar to the enlarged, disc portion of a lollipop-style NFT but are approximately half the size of an NFT with a first higher order $TE_{10}$ mode excitation. A narrower NFT width may benefit NFT reliability in a peg recess due to vacancy migration from the enlarged portion of the NFT to the peg.

FIG. 5 illustrates NFT efficiency as a function of the NFT length, the dimension along the waveguide, when the waveguide tilt angle was set at forty-five degrees. It can be seen that the NFT efficiency oscillates with increasing NFT length, L, with a period of approximately 180 nm. There are two noticeable peaks of improved efficiency at lengths of 430 nm and at 610 nm in the length range that was measured. These dimensions can be used to compare an NFT according to embodiments disclosed herein, with an NFT utilizing $TE_{10}$ mode excitation.

Figure 6:
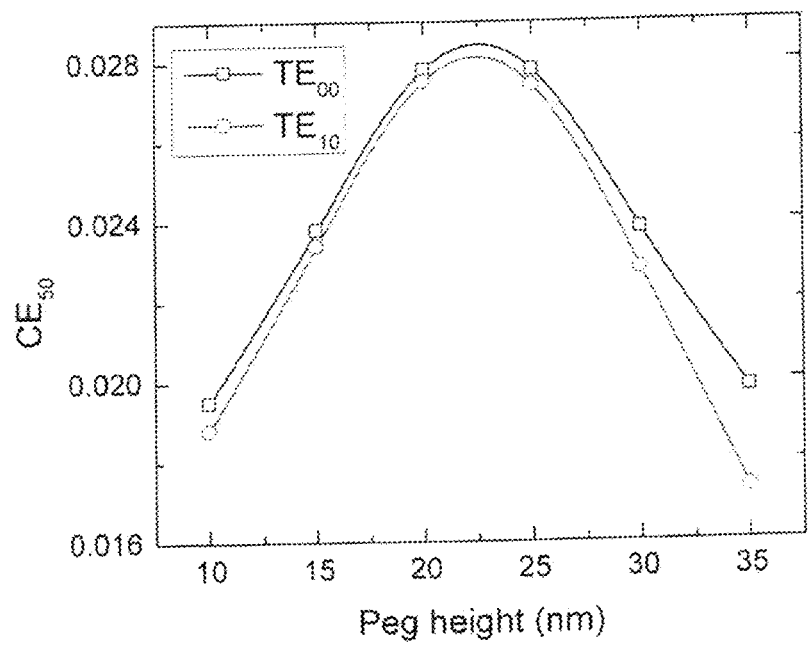
FIG. 6 is a graph illustrating near-field transducer efficiency as a function of the peg height according to an example embodiment.

FIG. 6 illustrates a comparison of NFT efficiency of an NFT with $TE_{00}$ mode excitation, according to embodiments herein, with an NFT with $TE_{10}$ mode excitation with respect to varying peg heights (z-direction dimension). Using the NFT and waveguide core dimensions set forth above along with an NFT enlarged portion length of 610 nm, an NFT with $TE_{00}$ mode excitation includes a slanted magnetic pole connected with the NFT via a gold heatsink for the comparison. The magnetic pole is 200 nm wide, wrapped with a Cr heatsink, and spaced 20 nm from the NFT at the media-facing surface. The total width of the pole (along x-direction) including the Cr heatsink is 600 nm, and the heatsink/pole is truncated at the far end of the NFT. Similar to the above peg dimensions, the peg is 30 nm thick along the y-direction, but here is 40 nm wide along the x-direction. As can be seen in FIG. 6, both mode profiles provide similar NFT efficiency, but the NFT with $TE_{00}$ mode excitation has a lower sensitivity to peg height. The modeling also shows that the absorption in the peg between the two designs is comparable.

The NFT efficiency can also be varied by altering waveguide core dimensions such as the cross-section and/or tilt angle. For example, changing the tilt angle to fifty-five degrees increases the NFT efficiency by fifteen percent. When altering the waveguide dimensions, the waveguide core can be made thinner (along the y-direction) and wider (e.g., dimension, W, in FIG. 2A) to keep the waveguide as a single mode and to have a preselected mode index. In certain embodiments, the waveguide core can be altered from 390 nm by 120 nm to 510 nm by 100 nm to increase NFT efficiency by twenty percent without the presence of a magnetic pole, or by five percent with the presence of a magnetic pole and NFT heatsink. This change reduces bending loss when forming the tilted waveguide normal to an input surface of a slider and reduces scattering loss from waveguide core sidewall roughness.

Figure 7A:
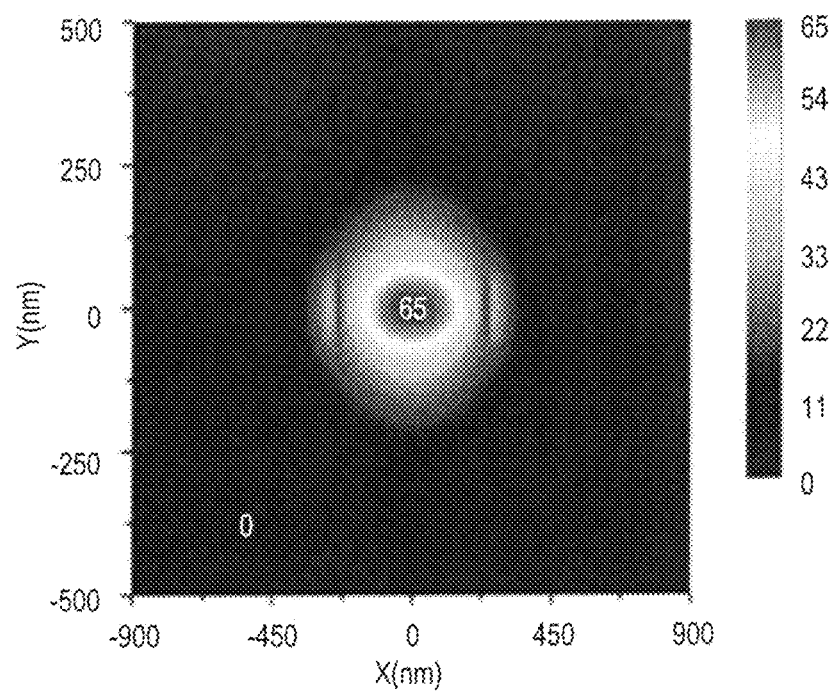
FIG. 7A is an amplitude profile for $TE_{00}$ mode excitation.
Figure 7B:
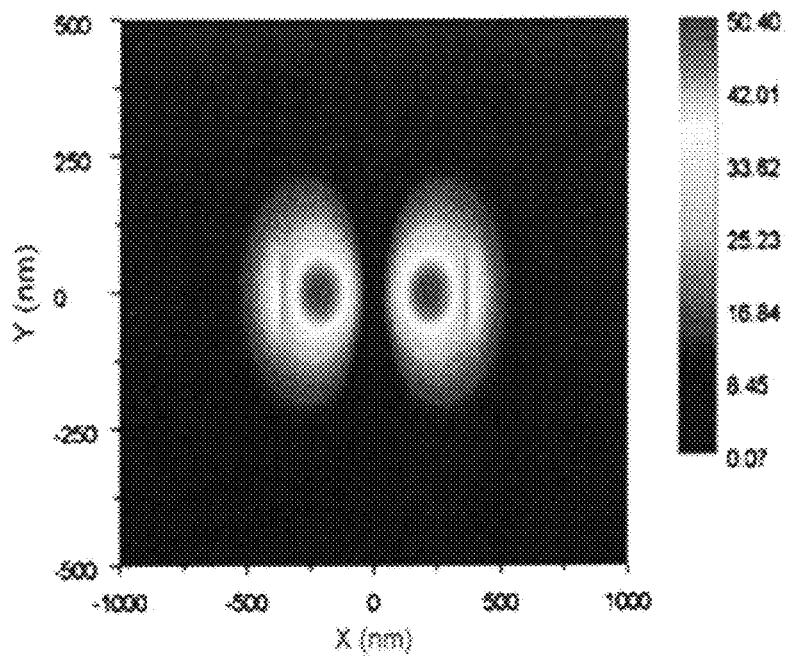
FIG. 7B is an amplitude profile for $TE_{10}$ mode excitation.

Increased NFT efficiency can also increase background heating in the recording medium; however, such direct heating of the medium from the waveguide core is not beneficial in HAMR. Since the fundamental mode ($TE_{00}$) has a more concentrated energy density than $TE_{10}$ mode, background heating in the recording medium from residue $TE_{00}$ mode excitation is usually greater than that of waveguides delivering $TE_{10}$ mode energy. FIG. 7A illustrates a mode profile for $TE_{00}$ mode excitation and FIG. 7B illustrates a mode profile for $TE_{10}$ mode excitation. The core dimensions for the waveguide of FIG. 7A are 510 nm by 100 nm, and the core dimensions for the waveguide of FIG. 7B are 750 nm by 120 nm. As can be seen, the peak amplitude in FIG. 7A is 64.9 for the $TE_{00}$ mode; whereas, the peak amplitude for the $TE_{10}$ mode is 50.4. Thus, the power density ratio between the two modes is approximately $(64.9/50.4)^2=1.66$. However, tilting the waveguide core, as described in various embodiments herein, for a $TE_{00}$ mode waveguide reduces this power density by $\cos(\theta)$. If the tilt angle is forty-five degrees, this would be 0.71, and if the tilt angle is fifty-five degrees, this would be 0.57. For example, a tilt angle of forty-five degrees reduces the peak power density ratio to 1.17. In addition to the excitation mode, radiation of the NFT to the recording medium also contributes to background heating.

Figure 8A:
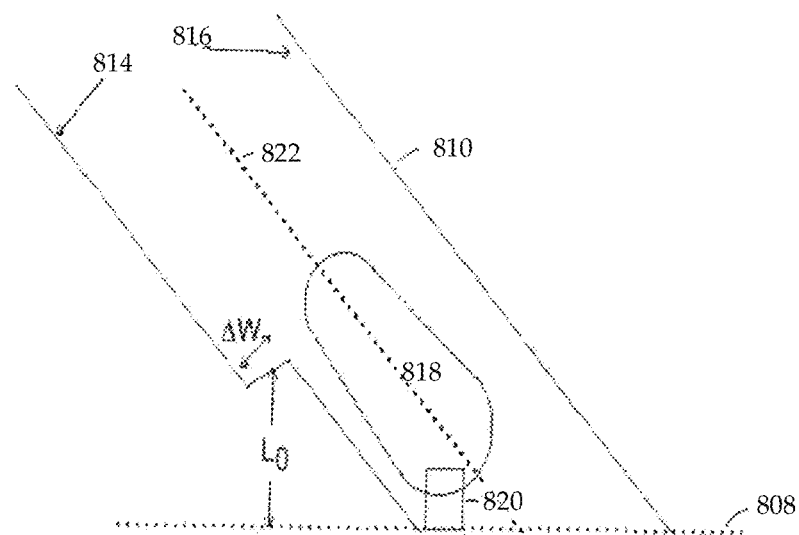
FIGS. 8A-B are cross-sectional views of shaped waveguides according to example embodiments.
Figure 8B:
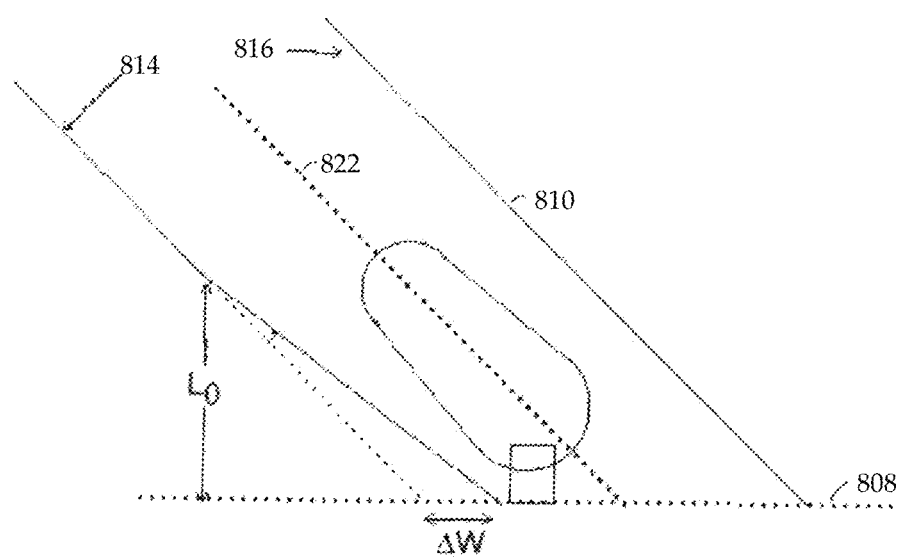

NFT radiation-based background heating can be reduced by altering the waveguide core 810 dimensions. For example, the waveguide core 810 can be shaped asymmetrically at the output end to reduce the NFT radiation reaching the medium. FIGS. 8A and 8B illustrate alternative examples for shaping the output end of the waveguide core 810 to reduce the footprint of the waveguide core 810 at the media-facing surface 808. The waveguide core 810 includes two illustrated sidewalls 814, 816. Sidewall 814 is positioned closer to the media-facing surface 808 as a result of the angled approach of the waveguide core 810 toward the media-facing surface 808. In FIG. 8A, a stepped reduction in the width of waveguide core 810 is shown by reducing the width/distance of sidewall 814 from the waveguide core 810 center line (represented by dashed line 822). For example, the distance between sidewall 814 and center line 822 is reduced at a sharp angle (e.g., ninety degrees) for a designated distance (e.g., $\Delta W$). Then sidewall 814 mirrors the original tilt angle at the new distance from the center line 822 along the length of the waveguide core 810 to the media-facing surface 808. The shaping length, e.g., the distance from the media-facing surface at which the waveguide core 810 width reduction begins, is designated as $L_0$. Although the cross-section of the output end of the waveguide core 810 is reduced, the width of the NFT (both the enlarged portion 818 and the peg 820) remains less than the width of sidewalls 814, 816 of waveguide core 810 at the output end of the waveguide core 810.

FIG. 8B also shows a reduction in the cross-track width of the waveguide core 810 at the media-facing surface 808, but the reduction is achieved by tapering sidewall 814. Similarly to FIG. 8A, the shaping length, e.g., the distance from the media-facing surface at which the tapering begins, is designated as $L_0$. Here, the change in width, $\Delta W$, effected on sidewall 814 can be measured at the media-facing surface 808 by comparing the difference between the cross-track location where sidewall 814 reaches the media-facing surface 808 and the cross-track location where sidewall 814 would have reached the media-facing surface 808 with the original tilt angle. In embodiments where the waveguide core 810 is shaped via tapering, the sidewalls 814, 816 intercept the media-facing surface 808 at different angles with respect to normal. While both of these shaping configurations reduce background heating, their effectiveness can be compared by measuring NFT efficiency for each configuration.

FIG. 9 is a graph comparing the NFT efficiency as a function of the shaping length, $L_0$, for both a tapered shaping and a stepped shaping of a waveguide core. For both shaping configurations, the change in width, $\Delta W$, is 150 nm. The modeling was performed with the presence of a magnetic pole and NFT heatsink. As long as the shaping length is at least the length of the NFT, the NFT efficiency improves and the peak background heating can be reduced by 25-35%. This reduction can, at least partly, compensate for the increased background heating due to the fundamental mode excitation by bringing the background heating to a level comparable to a waveguide with $TE_{10}$ mode excitation.

FIGS. 10A and 10B illustrate this reduction in background heating. FIG. 10A is an absorption profile at the middle plane of a recording layer of a medium exposed to an angled waveguide core and NFT with $TE_{00}$ mode excitation according to embodiments described herein. FIG. 10B is an absorption profile at the middle plane of a recording layer of a medium exposed to a waveguide core and NFT with $TE_{10}$ mode excitation. FIG. 10A shows some background absorption on the lower left side of the NFT hot spot while FIG. 10B shows background absorption behind the NFT hot spot. However, the amount of background absorption in both figures is comparable. Similarly, full-width-at-half-maximum (FWHM) of both hot spots is comparable with 65 nm in the cross-track direction and 58 nm in the down-track direction. Modeling further shows that the return, or reflected, $TE_{00}$ mode is about 0.028% for a fully integrated head. This includes an NFT, magnetic pole, NFT heatsink, and asymmetric waveguide shaping. At this level, the return light would not result in laser instability such as mode hopping.

Figure 11:
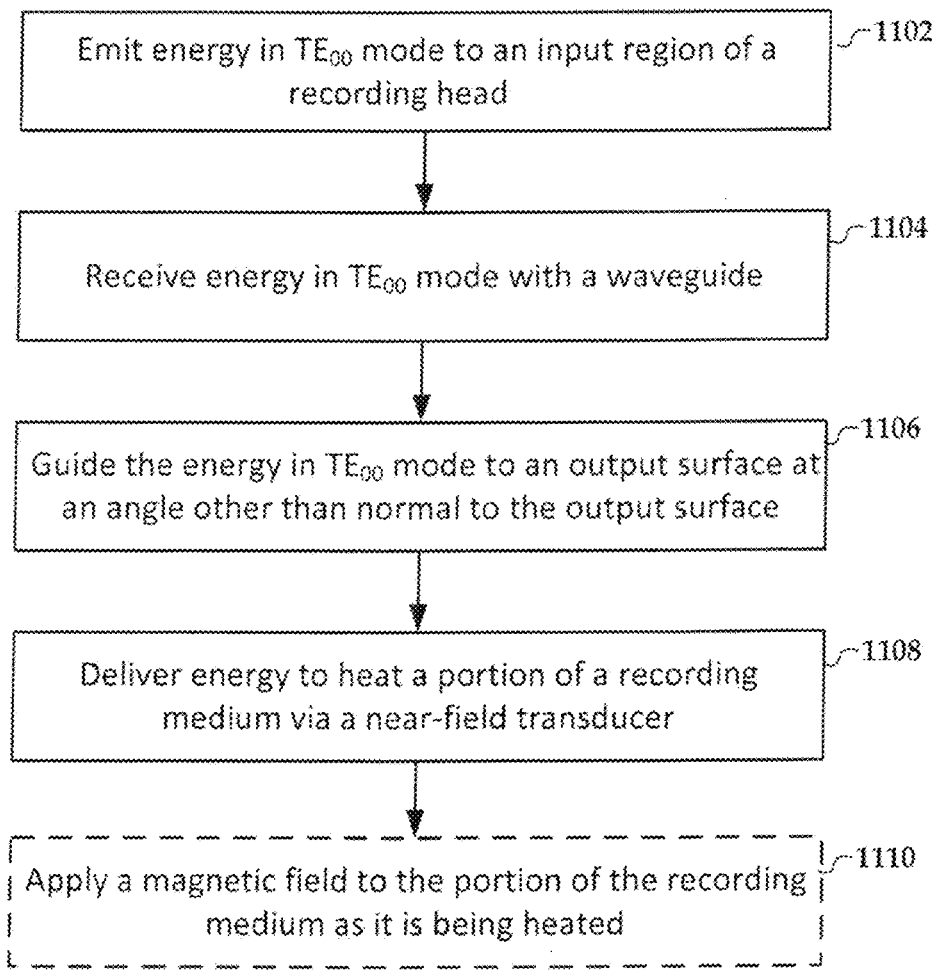
FIG. 11 is a flowchart illustrating a method according to an example embodiment.

In reference now to FIG. 11, a flowchart illustrates a method according to an example embodiment. The method involves emitting 1102 energy, e.g., laser light polarized in a fundamental transverse electric ($TE_{00}$) mode, from a laser to an input surface of an input region of a recording head. The input surface is substantially parallel to a media-facing surface, and the light may be (although is not required to be) emitted normal to the input surface. In response to emitting 1102 the light, the light is received 1104 in the $TE_{00}$ mode with an input end of a waveguide proximate the input surface. The waveguide guides the light in the $TE_{00}$ mode to an output end proximate an output surface of the recording head, such as the media-facing surface, at an angle other than normal 1106 to the output surface. The output end is at an oblique angle to a cross-track line at an intersection of the output surface and a plane normal to the output surface. However, the waveguide may be disposed at an angle substantially normal to the input surface at the input surface.

In addition, the light in the $TE_{00}$ mode is guided to an NFT proximate the output end of the waveguide. The NFT comprises an enlarged portion and a peg, and the enlarged portion comprises first and second curved ends connected by straight sides and is oriented at the oblique angle to the cross-track line. For example, each of the angled components can be disposed at an angle of greater than thirty degrees from a position normal to the output surface. The angle of the waveguide may be selected so as to reduce reflection of light back to the laser from the recording medium and other components, such as the NFT and magnetic writer, proximate the output surface. The light may also be guided through a curved bend in the waveguide between the input end and output end, and the width of the waveguide in the cross-track direction can vary between the input end and output end of the waveguide.

Energy is then delivered 1108 to heat a portion of a recording medium via the NFT. Optionally, a magnetic field may be applied 1110 to the portion of the recording medium as it is being heated. In this way, the magnetic field records data to the recording medium.

An NFT and light path (e.g., waveguide) in accordance with various embodiments described herein deliver light in the fundamental transverse electric ($TE_{00}$) mode. Angling the waveguide at an oblique angle (e.g., greater than thirty degrees) from a direction normal to the media-facing surface efficiently excites a similarly angled NFT and reduces return light reflected from a recording medium below 0.1% to provide laser stability. Asymmetric waveguide shaping and waveguide angling at the media-facing surface reduce the direct heating in the recording medium from the reside waveguide mode to a level comparable with the direct heating experienced by exposure to a light path and NFT with $TE_{10}$ mode excitation.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a waveguide having an input end that receives energy in a transverse electric ($TE_{00}$) mode from an energy source along a substrate-parallel plane;
   a near-field transducer located proximate an output end of the waveguide and receiving the energy in the $TE_{00}$ mode, the output end of the waveguide being at an oblique angle to a cross-track line at an intersection of a media-facing surface and the substrate-parallel plane, the near-field transducer comprising:
      an enlarged portion comprising first and second curved ends connected by straight sides, the enlarged portion at the oblique angle to the cross-track line; and
      a peg extending from the enlarged portion towards the media-facing surface, the peg at an angle about normal to the cross-track line.

2. The apparatus of claim 1, wherein the first curved end faces the media-facing surface and has a radius greater than a radius of the second circular end.

3. The apparatus of claim 1, wherein the oblique angle is selected to minimize reflections of the energy back to the energy source.

4. The apparatus of claim 1, wherein the input end of the waveguide is normal to the media-facing surface.

5. The apparatus of claim 4, wherein the waveguide comprises a curved bend between the input end and output end.

6. The apparatus of claim 4, wherein the waveguide comprises an S-bend between the input end and output end.

7. The apparatus of claim 1, wherein the width of the waveguide in a cross-track direction varies between the input end and output end.

8. The apparatus of claim 7, wherein the output end of the waveguide is asymmetrical.

9. The apparatus of claim 8, wherein the output end of the waveguide comprises a taper in the cross-track direction toward the media-facing surface.

10. The apparatus of claim 8, wherein the output end of the waveguide comprises a stepped reduction in width in the cross-track direction.

11. An apparatus, comprising:
    a waveguide having an input end that receives energy in a transverse electric ($TE_{00}$) mode from an energy source along a substrate-parallel plane and an output end, wherein a width of the waveguide in a cross-track direction varies between the input end and the output end;
    a near-field transducer located proximate the output end of the waveguide and receiving the energy in the $TE_{00}$ mode, the output end of the waveguide being at an oblique angle to a cross-track line at an intersection of a media-facing surface and the substrate-parallel plane, the near-field transducer comprising:
       an enlarged portion comprising first and second curved ends connected by straight sides, the enlarged portion at the oblique angle to the cross-track line; and
       a peg extending from the enlarged portion towards the media-facing surface, the peg at an angle about normal to the cross-track line.

12. The apparatus of claim 11, wherein the first curved end faces the media-facing surface and has a radius greater than a radius of the second curved end.

13. The apparatus of claim 11, wherein the input end of the waveguide is normal to the media-facing surface.

14. The apparatus of claim 13, wherein the waveguide comprises a curved bend between the input end and output end.

15. The apparatus of claim 11, wherein the output end of the waveguide is asymmetrical.

16. The apparatus of claim 11, wherein the oblique angle is selected to minimize reflections of the energy back to the energy source.

17. A method comprising:
    emitting energy in a transverse electric ($TE_{00}$) mode from an energy source to an input surface of a recording head;
    receiving the energy in the $TE_{00}$ mode with an input end of a waveguide proximate the input surface;
    guiding the energy in the $TE_{00}$ mode to an output end of the waveguide proximate an output surface of the recording head, the output end being at an oblique angle to a cross-track line at an intersection of the output surface and a plane normal to the output surface, and to a near field transducer proximate the output end, wherein the near field transducer comprises an enlarged portion and a peg, the enlarged portion comprising first and second circular ends connected by straight sides and oriented at the oblique angle to the cross-track line; and
    delivering energy to heat a portion of a recording medium via the near field transducer.

18. The method of claim 17, wherein the input end of the waveguide is normal to the input surface and the output surface.

19. The method of claim 18, wherein the energy is guided through a curved bend in the waveguide between the input end and output end.

20. The method of claim 17, wherein the width of the waveguide in the cross-track direction varies between the input end and output end.

* * * * *